(12) United States Patent
Vembu

(10) Patent No.: US 6,185,432 B1
(45) Date of Patent: Feb. 6, 2001

(54) SYSTEM AND METHOD FOR SELECTING POWER CONTROL MODES

(75) Inventor: Sridhar Vembu, San Jose, CA (US)

(73) Assignee: Qualcomm Incorporated, San Diego, CA (US)

( * ) Notice: Under 35 U.S.C. 154(b), the term of this patent shall be extended for 0 days.

(21) Appl. No.: 09/164,383

(22) Filed: Sep. 30, 1998

Related U.S. Application Data

(60) Provisional application No. 60/062,821, filed on Oct. 13, 1997, and provisional application No. 60/062,819, filed on Oct. 13, 1997.

(51) Int. Cl.[7] .................................................. H04B 7/00
(52) U.S. Cl. ............................................ 455/522; 455/69
(58) Field of Search ............................. 455/522, 68, 69, 455/70; 370/342, 318

(56) References Cited

U.S. PATENT DOCUMENTS

| | | |
|---|---|---|
| 5,333,175 | 7/1994 | Ariyavisitakul et al. . |
| 5,383,219 * | 1/1995 | Wheatley, III et al. ............. 370/342 |

FOREIGN PATENT DOCUMENTS

| | | |
|---|---|---|
| 0330166 | 2/1989 | (EP) . |
| 0548939 | 12/1992 | (EP) . |
| 0709973 | 5/1996 | (EP) . |
| 2301737 | 12/1996 | (GB) . |

\* cited by examiner

*Primary Examiner*—Doris H. To
(74) *Attorney, Agent, or Firm*—Phillip T. Wadsworth; Gregory D. Ogrod

(57) ABSTRACT

A system and method for switching between power control modes is implemented in a communication system having two or more power control modes for providing a power increase for a transmitted signal. The system and method determine whether performance of the communication system is within nominal bounds. If the performance of the communication system is within nominal bounds, a first mode of power control is selected for controlling transmitter power. If the performance of the communication system is not within the nominal bounds, a second mode of power control for controlling a transmitter is selected.

20 Claims, 3 Drawing Sheets

SYSTEM AND METHOD FOR SELECTING POWER CONTROL MODES

CROSS-REFERENCE TO RELATED APPLICATIONS

This is a continuation of both provisional applications 60/062,821 filed Oct. 13, 1997 and 60/062,819, filed Oct. 13, 1997. This application is related to a commonly-owned application, filed on even date herewith, entitled "*System And Method For Optimized Power Control*" and having application Ser. No. 09/164,384 which is incorporated herein by reference.

BACKGROUND OF THE INVENTION

I. Field of the Invention

The present invention relates generally to wireless communication systems. More particularly, the present invention relates to a novel and improved system and method of power control for a wireless communication device.

II. Field of the Invention

Wireless communication networks are enjoying notable popularity in all aspects of business, industry and personal life. As such, portable, hand-held wireless communication devices have experienced widespread growth in recent years. Portable devices such as cellular and Personal Communication Services (PCS) phones are now commonplace for business and personal users alike. Additionally, advanced systems, such as satellite communications systems using portable, hand held and mobile phones, are on the horizon.

One design goal of hand-held communication devices is that of low power consumption. Low power consumption provides lower heat generation and extended battery life which increases device usefulness. Often times, lower power consumption also allows for or leads to smaller device sizes.

In CDMA communication systems, the transmitted power of signals within the system is controlled so as to maintain the amount of power required for any given communication link at a minimum level. This serves to maximize overall communication system capacity and maintain acceptable levels of mutual interference and signal quality. By controlling the transmitted signal power at or near the minimum level, interference with other communication devices or units is reduced. Examples of techniques for power control in such communication systems are found in U.S. Pat. Nos. 5,383,219, entitled "*Fast Forward Link Power Control In A Code Division Multiple Access System,*" issued Jan. 17, 1995; 5,396,516, entitled "*Method And System For The Dynamic Modification Of Control Parameters In A Transmitter Power Control System,*" issued Mar. 7, 1995; and 5,267,262, entitled "*Transmitter Power Control System,*" issued Nov. 30, 1993, which are incorporated herein by reference.

One technique for decreasing the amount of power consumed by the device is to minimize the amount of power in the transmitted signal. Often times, this is accomplished by decreasing the amount of power in the transmitted signal as much as possible without the signal-to-noise ratio (SNR) falling below an acceptable level. When the SNR falls below the acceptable level, the power is increased to bring the SNR back up to an acceptable level.

This approach is advantageous because it allows a minimum amount of power to be used for communications under optimum conditions. When operating in less than optimum or ideal conditions that is, inside a building, in bad weather, or such, transmission power is increased to maintain acceptable SNR and communications quality.

With some systems, such as cellular or other wireless communications systems for example, the wireless communication device, that is, a cellular phone, is controlled remotely. That is, part of the communication bandwidth between the device and a base station transceiver is dedicated to transferring command and status information. This command and status portion of the bandwidth is used to adjust the power of signals transmitted by the device. When the SNR of communication signals received by a base station falls below an acceptable level, the base station sends a command to the wireless device to increase its transmitted power. Similarly, if the SNR of the received communication signals is well within acceptable limits, the base station commands the device to decrease transmitter power.

SUMMARY OF THE INVENTION

The present invention is a novel and improved system and method for dynamically selecting a mode of power control for a communication device. According to the invention, two modes are provided for controlling power of the transmitter as well as a technique for selecting the appropriate mode depending on the operating conditions.

The two modes of controlling power are termed "tracking mode" and "burst mode." In tracking mode, power is incrementally increased when the SNR is below an acceptable level. In burst mode, power is also increased when the SNR is below an acceptable level. However, in the burst mode, the power increase is greater than the increase applied in the tracking mode. Thus, tracking mode is best suited for handling minor perturbations in SNR as it varies above and below the threshold level. In contrast, burst mode is best suited for handling situations where the SNR falls significantly below the acceptable level, such as when the transmission path is obstructed, such as by a building, for example.

Selection between the two modes is accomplished based on system performance. If the system is operating nominally, the preferred mode of power control is the tracking mode. If, however, the system performance is degraded below a nominal range, the power control mode is switched to the burst mode.

In one embodiment, system performance is based on the SNR of a transmitted signal. Specifically, in one mode of this embodiment, the SNR of a signal received at a transceiver is compared with a predetermined threshold level. When the SNR is at or near the threshold, the system is performing nominally. However, when the SNR falls below a certain level, performance is below nominal.

In another embodiment, a determination of system performance is based on a number errors in the data being received. This can be determined based on a number of frames received with errors, the bit error rate (BER) of the received signal, or other error tracking techniques.

One advantage of the invention is that the amount of time between the occurrence of a signal dropout and a subsequent recovery is reduced. Because system performance is monitored and the amount by which power is increased is determined accordingly, power increases are greater where conditions warrant. As a result, system performance can be returned to within nominal bounds or desired limits in a much shorter period of time than would otherwise be the case if the amount of power increase were to remain constant.

Further features and advantages of the present invention, as well as the structure and operation of various embodiments of the present invention, are described in detail below with reference to the accompanying drawings.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

I. Overview and Discussion of the Invention

The present invention is directed toward a system and method for offering multiple modes of power control to a communications device. The invention is further directed toward determining and selecting an optimum mode of power control for the communications device depending on system performance. The manner in which this is accomplished is described in detail below.

II. Example Environment

Before describing the invention in great detail, it is useful to describe an exemplary environment in which the invention can be implemented. In a broad sense, the invention can be implemented in any communication system, especially one in which it is desirable to control the amount of power provided by a transmitter. Such environments include, without limitation, cellular communication systems, personal communication systems, satellite communication systems, and many other known systems.

Figure 1:
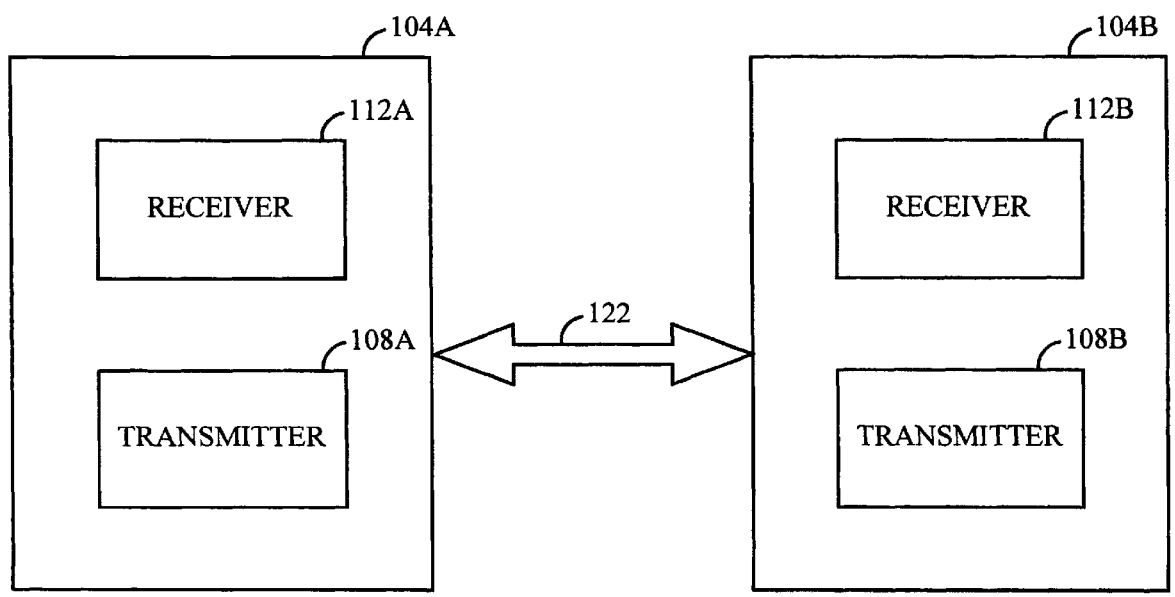
FIG. 1 is a diagram illustrating a simplified exemplary communication system.

FIG. 1 is a diagram illustrating an exemplary communication system 100. Referring to FIG. 1, the exemplary communication system has two transceivers 104a and 104b. Transceivers 104a and 104b each have a transmitter 108a and 108b, and a receiver 112a and 112b, respectively.

Data or other information is transmitted from a transmitter 108 (108a, 108b) to a receiver 112 (112b, 112a) in another transceiver 104 (104b, 104a) for which the signal is intended, via transmission path 122. In satellite, cellular, and other wireless communication systems, transmission path 122 is the air. However, the present invention is not limited to such applications, and transmission path 122 can be a wire or other signal transfer medium known in the art.

In some environments, transmission path 122 is a packetized data path in which the data are transmitted in data packets. This is usually the case where the information is in the form of digital data. In other environments, analog data are modulated onto a carrier and transmitted across transmission path 122.

In the example of a cellular communication system, one transceiver 104 (104a, 104b) can be, or is located in, a hand-held or mobile cellular telephone and the other transceiver 104 (104b, 104a) is located in a base station at a cell site that is providing service in the wireless device's or telephone's current physical location area. In the example of a satellite communication system, one transceiver 104 (104a, 104b) can be a hand-held, mobile, or fixed transceiver (e.g., a satellite telephone) and the other transceiver 104 (104b, 104a) is located in a gateway (or an earth station gateway). In the satellite communication system example, a satellite (not illustrated) is used to relay signals between transceivers 104 (104a, 104b), as is well known in the art. Alternatively, one transceiver 104 can be located on board the satellite itself.

The present invention is described in terms of this exemplary environment. Description in these terms is provided for convenience only. It is not intended that the invention be limited to application in this exemplary environment. In fact, after reading the following description, it will become apparent to a person skilled in the relevant art how to implement the invention in alternative environments where the power of a transmitter is or can be controlled.

III. Power Control

According to the invention, there are at least two modes of power control: "tracking mode" and "burst mode." Both the tracking mode and burst mode of power control provide increases in power when system performance falls below an acceptable level. However, in burst mode, the amount of the power increase is greater than that provided in the tracking mode.

Selection between the tracking mode and the burst mode is accomplished based on the system performance of the communication link. Specifically, if the system performance is within a preselected or defined nominal range, the tracking mode is utilized. If, however, system performance falls below this nominal range, the burst mode of power control is utilized. Utilization of the burst mode brings the system performance to the nominal range more quickly than would otherwise be the case for the tracking mode.

Thus, the tracking mode is well suited to controlling power in nominal operating conditions where the SNR is varying by small amounts above and below the threshold level. In contrast, burst mode is well suited for controlling power in conditions where large power drop-offs are experienced. Such conditions can result where, for example, the communication path is blocked by a large building or other interfering structure or condition.

In one embodiment, system performance is based on the signal-to-noise ratio (SNR) of a signal transmitted by a transmitter (such as transmitter 108a or 108b). In this embodiment, the tracking mode increases the power in small increments when the signal-to-noise ratio (SNR) falls below an acceptable level. Burst mode also increases the power when the signal-to-noise ratio (SNR) falls below an acceptable level. However, in burst mode, the amount of the power increase is greater than that provided in the tracking mode. Selection between the two modes is accomplished based on how far the SNR falls below the acceptable level. That is, based on whether or not the performance of the communication link is considered nominal. In another embodiment, system performance is based on receive signal strength independent of the SNR.

In an alternative embodiment, system performance is based on the number of frames received with errors. In this embodiment, if a receiver receives a large number of frames or data with errors in a given time period (or a specified number of consecutive frames with errors), the burst mode is selected for controlling power. If, on the other hand, the receiver receives only occasional frame errors, tracking mode is selected.

In one embodiment, the power increase for each mode is incremental. That is, for a given command or decision to increase the power, the power is increased by a preselected incremental amount. Power is not increased again until a subsequent command or decision is made to again increase the power. In an alternative embodiment, for a given command or decision to increase the power, the power increases gradually until a subsequent command is received to terminate the power increase. In either embodiment, burst mode provides a greater increase in power than the tracking mode. That is, the burst mode provides a larger incremental power increase in the first embodiment and a more rapid rate of increase in the second embodiment.

Figure 2A:
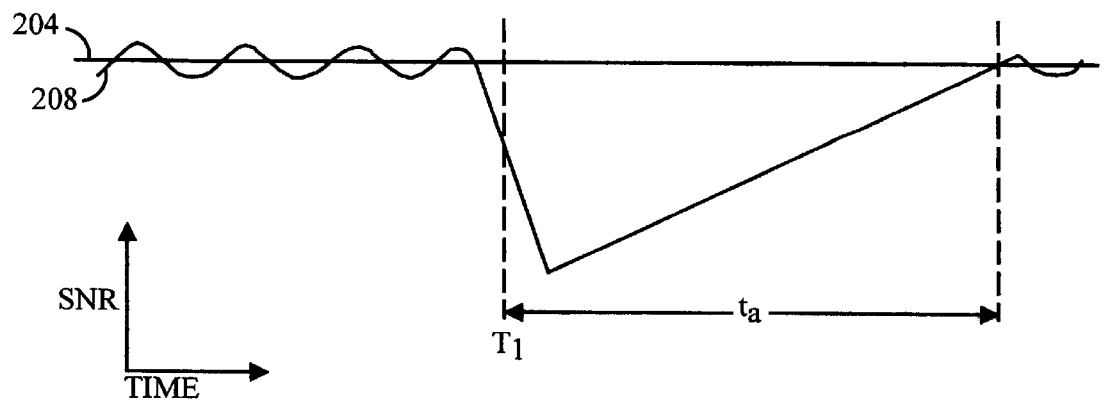
FIG. 2A is a diagram illustrating power control using a conventional tracking mode.

FIG. 2A is a diagram illustrating an exemplary operational scenario where power is controlled in only the tracking mode. In FIG. 2A, the horizontal axis represents time and the vertical axis represents SNR. The threshold SNR is illustrated by horizontal line 204. An example of the actual SNR of the transmitted signal is illustrated by the time-varying line 208. In the example illustrated in FIG. 2A, the device is operating nominally up until a time $T_1$. In this region, SNR 208 of transmitter 108 is varying by a small amount about SNR threshold 204. Adjustments are made to the transmitted power in small increments. When SNR 208 falls below threshold 204, power is incrementally increased. Conversely, when SNR 208 rises above threshold 204, power is incrementally decreased. Power adjustments for transmitters are made using commands or control and operation techniques well known in the art.

At time $T_1$, the SNR for signals traversing transmission path 122 drops significantly. This can occur where, for example, the path is obstructed. In the tracking mode, the power is increased incrementally to improve the SNR. However, because the power is only increased slightly for each increment in the tracking mode, a significant amount of time elapses before the SNR again reaches an acceptable level. This is illustrated by the time duration $t_r$.

Figure 2B:
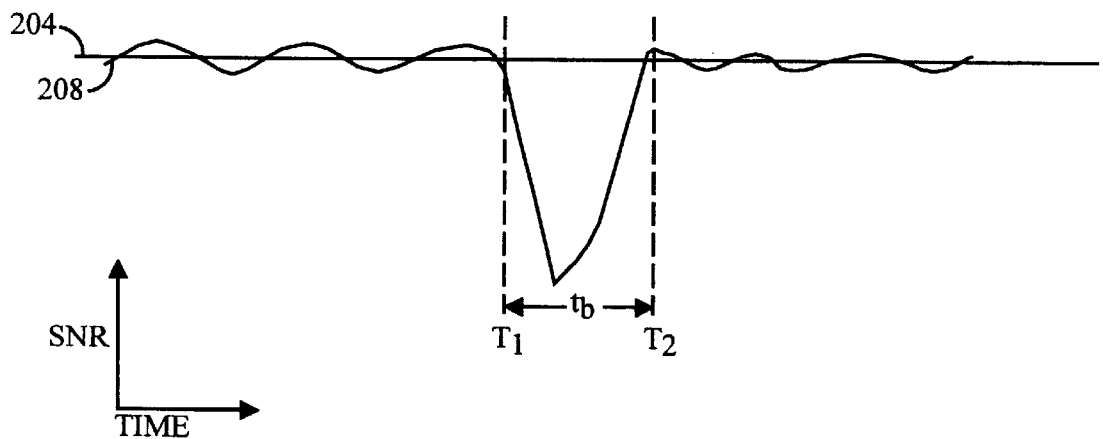
FIG. 2B is a diagram illustrating power control using two modes of power control.

FIG. 2B is a diagram illustrating an exemplary operational scenario where power is selectively controlled in both the tracking mode and the burst mode. As with FIG. 2A, in FIG. 2B the horizontal axis represents time and the vertical axis represents SNR. The threshold SNR is illustrated by horizontal line 204. An example of the actual SNR of the transmitted signal is illustrated by the time-varying line 208. In the example illustrated in FIG. 2B, the device is operating nominally up until time $T_1$. In this region, SNR 208 of a transmitter 108 transmitted signal is varying by a small amount about SNR threshold 204. During this time period, transmitter 108 is operating in the tracking mode and adjustments are made to the transmitted power in small increments. When SNR 208 falls below threshold 204, power is incrementally increased.

At time $T_1$, when transmission path 122 is obstructed and the SNR drops significantly, the transmitter power control mode is switched to the burst mode. As described above, in the burst mode the power increase is more significant than in the tracking mode. As such, the amount of time, $t_b$, that it takes for the SNR to return to an acceptable level is much shorter than the time $t_r$ required in the tracking mode. At time $T_2$, when the SNR 208 reaches threshold 204, transmitter 108 is switched to tracking mode.

Note that it is generally not desirable to remain in the burst mode during nominal operating conditions. This is because a small decrease in SNR would result in a large increase in transmitter power. This would cause SNR 208 to rise well above threshold 204 due to an excess in transmitter power. This wastes power, and in systems that are power limited, or power affects capacity, this would prove very undesirable. It might also create an oscillatory behavior in some situations when the system tries to compensate and return to the threshold level, overshooting in each direction.

In one embodiment, selection of the power control mode is made by a receiver 112. In this embodiment, receiver 112 (112a, 112b) instructs transmitter 108 (108b, 108a) (of opposite transceiver 104) to switch power control modes when necessary. This can be done, for example, in a command portion of the transmitted signal. In an alternative embodiment, receiver 112 provides information back to transmitter 104 to enable transmitter 104 to make a decision as to whether or not to switch power control modes. For example, in this alternative embodiment, receiver 112 may send one or more indications such as a frame error indication, such as a bit error rate value, a SNR value, or some other indication of whether or not the transmission is within nominal or desired characteristics to transmitter 108 (receiver 104).

Figure 3:
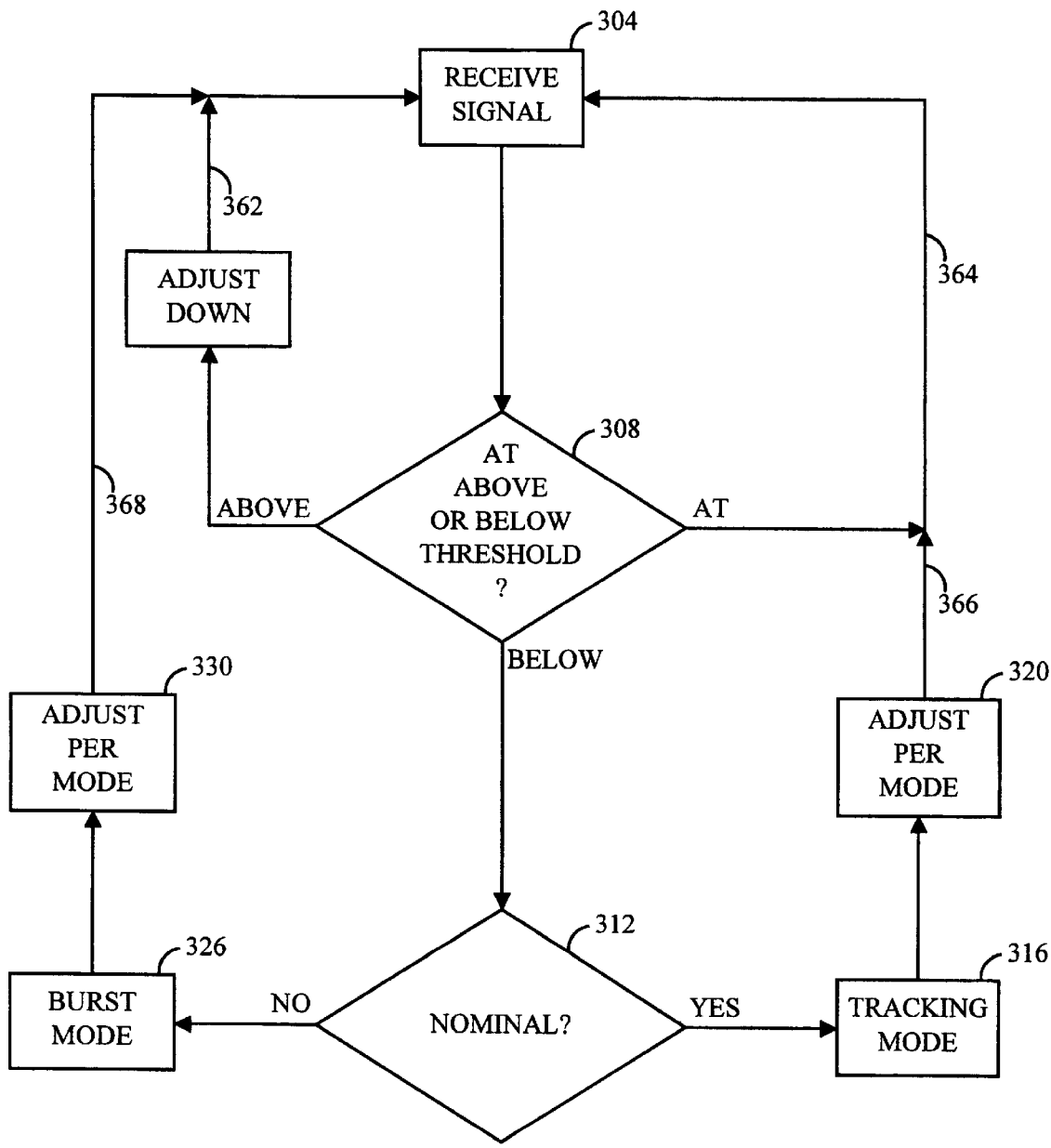
FIG. 3 is an operational flow diagram illustrating a process of selecting between two modes of power control according to one embodiment of the invention.

FIG. 3 is an operational flow diagram generally illustrating a process of determining and selecting an appropriate power control mode according to one embodiment of the invention. In a step 304, receiver 112 (112a, 112b) receives a signal transmitted by transmitter 108 (108b, 108a). In the exemplary environment described above, the signal is transmitted across transmission path 122.

Receiver 112 (112a, 112b) determines whether or not SNR 208 of the received signal is above, at or below a preselected threshold 204. This can be done regardless of the power control mode in which the communication system is operating. This decision is illustrated by a decision step 308. If SNR 208 of the received signal is above threshold 204, the power is adjusted down and the operation returns to step 304 where receiver 108 continues to receive the transmitted signal. This is illustrated by step 310 and flow line 362.

If SNR 208 is at threshold 204 and, therefore, no adjustment is necessary, the operation returns to step 304 as illustrated by flow line 364. In one embodiment, threshold 204 is not implemented as a single value, but instead encompasses an acceptable range of SNR values.

If, on the other hand, SNR 208 is below threshold, operation of the invention proceeds to a step 312. In step 312, receiver 112 determines whether or not the degradation in SNR 208 is greater than the desired nominal value. In other words, receiver 112 determines if SNR 208 is more than an acceptable amount below threshold 204 and, therefore, if the tracking mode is undesirable because it would take longer than desired to return the SNR 208 to threshold 204.

If the degradation in SNR 208 is within nominal limits, power is controlled using or by selecting the tracking mode as illustrated by step or block 316. If the power control mode is already the tracking mode, transmitter 108 remains in the tracking mode. However, if the current power control mode is burst mode, step 316 represents changing from burst mode to tracking mode. In a step 320, the power of the transmitter is adjusted in or during the tracking mode operation. Receiver 112 continues to receive the transmission as illustrated by flow lines 366, 364.

If the degradation in SNR 208 is beyond nominal limits, the power control mode is selected as the burst mode as illustrated by step or block 326. If the power control mode is already the burst mode, transmitter 108 remains in the burst mode. However, if the current power control mode is the tracking mode, step 326 represents a change from the tracking mode to the burst mode. In a step 330, the power is adjusted in or during the burst mode operation. Receiver 112 continues to receive the transmission as illustrated by flow line 368.

Alternative thresholds and values below threshold can be chosen to suit a particular application, as would be known. In one embodiment, threshold 204 is not a single value, but a range of values, such that as long as the received signal SNR falls within that range, the signal is said to be at threshold.

In one embodiment, the determination made in steps 308 and 312 is not made based on the SNR per se, but is instead made based on the number of frames received with one or more errors. For example, in one mode of this embodiment, receiver 112 determines how many frames of the past X number of frames were received with errors. In this example, if more than Y out of the last X frames were received with errors, this represents an error rate beyond nominal range and the preferred power control mode is the burst mode.

In an alternative mode of this embodiment, receiver 112 determines how many consecutive frames were received with errors. If the number of consecutive frames received with errors meets or exceeds a predetermined limit, this represents an error rate beyond nominal range and the preferred power control mode is the burst mode. Determining the number of frames received with errors can be accomplished using known techniques such as, for example, by way of a cyclic redundancy check (CRC) code.

In yet another embodiment, the invention looks at the bit error rate (BER) of the received signal. The BER rising above a threshold is analogous to the SNR 208 falling below threshold 204. If the BER rises above threshold by more than a predetermined amount, the system is no longer operating nominally and the preferred power control mode is burst mode.

It will become apparent to one skilled in the relevant art how other parameters can be utilized in conjunction with the present invention to determine whether the system is operating nominally.

In the embodiments described above, receiver 112 is described as determining whether or not the system is at, above, or below threshold and whether the system is operating nominally. In this embodiment, receiver 112 (112a, 112b) sends a command to transmitter 108 (108b, 108a) instructing transmitter 108 to change modes when appropriate. In alternative embodiments, receiver 112 simply provides telemetry to transmitter 108. This telemetry provides transmitter 108 with sufficient information to determine whether the preferred mode is the tracking mode or burst mode.

In one configuration, the receiver provides two feedback indicators in the form of bits in a message or command. One bit is used to indicate the "tracking mode up/down command" and the other indicates "burst mode transmit level adjustment." It is up to the transmitter to decide what is acted upon or implemented. A decision is made by the transmitter based on factors, such as, but not limited to, the number of consecutive frame errors, etc. In this approach, a faster reaction time is provided for the system because significant events such as errors are immediately reported to the transmitter, at the cost of increased bandwidth consumed for power control purposes.

In an embodiment where receiver 112 commands transmitter 108 to switch power control modes, it is possible that the command will be lost during the transmission. This scenario can be handled using any of several different techniques. One technique uses acknowledgment messages to confirm receipt of the command.

A second technique is to simply continue sending the command. For example, if the system is operating out of nominal bounds, receiver 112 sends a command to track in the burst mode during each command frame until the system has returned to nominal operation. Because the command is repeated, and because this repetition is, in many cases, unnecessary, this technique consumes more bandwidth than is required. For this reason, this technique may be undesirable.

According to yet another technique, the implementation, or not, of a power control mode change is ignored. That is, there is no checking to determine whether transmitter 108 has indeed switched power control modes as commanded. Although this embodiment may seem counterintuitive, it is actually a preferred embodiment. To understand why, consider two situations in which a command to switch modes can be sent by receiver 112 and not received by transmitter 108. In a first situation, SNR 208 has decreased substantially and receiver 112 commands transmitter 108 to switch power control modes to the burst mode. If transmitter 108 does not receive this command, the only negative result is that transmitter 108 continues to control the power in the tracking mode. That is, it takes longer to return to nominal operation than would otherwise be the case if the command were received by transmitter 108.

In a second situation, transmitter 108 is operating in the burst mode and the signal is returned to the nominal range. If transmitter 108 does not receive the command from receiver 112 instructing a change to the tracking mode, power may be increased greater than otherwise required. However, this is not a fatal error as the system continues to operate. The only disadvantage is that more power is being consumed than would otherwise be required.

After reading the above description, it would be apparent to one skilled in the relevant art how to implement the invention using a selection between alternative modes of power control in place of or in addition to the tracking mode and the burst mode. For example, the general commands used to increase and decrease return link signals can be incremented and decremented in large steps using this technique, regardless of the mode label.

IV. Conclusion

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What I claim as the invention is:

1. A system for selecting one of a plurality of power control modes for a transmitter operating in a communication system, the communication system having a first mode of providing one or more power increases of a first amount and a second mode for providing one or more power increases of a second amount, comprising:

means for determining whether performance of the communication system is within nominal bounds;

means for selecting the first mode of power control for controlling transmitter power if the performance of the communication system is within nominal bounds; and means for continuously selecting the second mode of power for controlling the transmitter to maintain the communication system performance within the nominal bounds, if the performance of the communication system is not within nominal bounds;

wherein the first mode is a tracking mode of power control and the second mode is a burst mode of power control, and wherein the burst mode of power control provides a greater increase in power than the tracking control of power control when system performance is below a threshold level.

2. The system of claim 1, wherein said performance of the communication system is measured according to one or more of the group comprising signal-to-noise ratio, frame error rate frequency, number of consecutive frame errors, and bit-error rate.

3. The system of claim 2, wherein said performance of the communication system is measured according to a signal-to-noise ratio.

4. The system of claim 1, wherein said means for determining whether performance of the communication system is within nominal bounds comprises means for determining whether a transmitted signal is at, above or below a threshold level.

5. The system of claim 1, wherein said means for determining whether performance of the communication system is within nominal bounds comprises means for determining whether a parameter of the communication system is within a defined range.

6. The system of claim 5, wherein said parameter is chosen from the group comprising signal-to-noise ratio, frame error rate frequency, number of consecutive frame errors, and bit-error rate.

7. The system of claim 6, wherein said performance of the communication system is measured according to a signal-to-noise ratio.

8. The system of claim 1, wherein said increase in power is an incremental power increase.

9. The system of claim 1, wherein said means for selecting the first and second modes of power are located at the transmitter.

10. The system of claim 9, wherein said means for selecting the first and second modes of power are located at a receiver location remote from the transmitter and further comprising means for transmitting a command from the receiver location to the transmitter to select a desired mode.

11. A method of selecting one of a plurality of power control modes for a transmitter operating in a communication system, the communication system having a first mode for providing one or more power increases of a first amount and a second mode for providing one or more power increases of a second amount, the method comprising the steps of:

determining whether performance of the communication system is within nominal bounds;

selecting the first mode of power control for controlling transmitter power if the performance of the communication system is within nominal bounds; and continually selecting the second mode of power control for controlling the transmitter to maintain the communication system performance within the nominal bounds, if he performance of the communication system is not within nominal bounds;

wherein the first mode is a tracking mode of power control and the second mode is a burst mode of power control, and wherein the burst mode of power control provides a greater increase in power than the tracking control of power control when system performance is below a threshold level.

12. The method of claim 11, wherein said performance of the communication system is measured according to one or more of the group comprising signal-to-noise ratio, frame error rate frequency, number of consecutive frame errors, and bit-error rate.

13. The method of claim 11, wherein said step of determining whether performance of the communication system is within nominal bounds comprises a step of determining whether said transmitted signal is at, above or below a threshold level.

14. The method of claim 11, wherein said step of determining whether performance of the communication system is within nominal bounds comprises a step of determining whether a parameter of the communication system is within a defined range.

15. The method of claim 14, wherein said parameter is chosen from the group comprising signal-to-noise ratio, frame error rate frequency, number of consecutive frame errors, and bit-error rate.

16. The method claim 11, wherein said increase in power is an incremental power increase.

17. The method of claim 11, wherein said steps of selecting the first and second modes of power are performed at the transmitter.

18. The method of claim 17, wherein said steps of selecting the first and second modes of power are performed at a receiver location remote from the transmitter and further comprise a step of transmitting a command from the receiver location to the transmitter to select a desired mode.

19. The method of claim 12, wherein said performance of the communication system is measured according to a signal-to-noise ratio.

20. The method of claim 15, wherein said performance of the communication system is measured according to a signal-to-noise ratio.

* * * * *